United States Patent
Hayasaka (10) Patent No.: US 6,169,944 B1
(45) Date of Patent: Jan. 2, 2001

(54) MICROCOMPUTER-BUILT-IN, ON-VEHICLE ELECTRIC UNIT

(75) Inventor: Satoshi Hayasaka, Miyagi-ken (JP)

(73) Assignee: Alps Electric Co., Ltd. (JP)

( * ) Notice: Under 35 U.S.C. 154(b), the term of this patent shall be extended for 0 days.

(21) Appl. No.: 09/129,707

(22) Filed: Aug. 5, 1998

(30) Foreign Application Priority Data

Aug. 5, 1997 (JP) .................................................. 9-210710

(51) Int. Cl.7 .................................................. G06F 19/00
(52) U.S. Cl. .............................. 701/36; 701/29; 700/300; 702/58
(58) Field of Search ............................... 701/29, 36, 115; 702/58, 59, 60; 348/730; 700/292, 299, 300; 361/71, 75

(56) References Cited

U.S. PATENT DOCUMENTS

| | | | | |
|---|---|---|---|---|
| 4,750,040 | * | 6/1988 | Hakamada | 348/730 |
| 4,972,340 | * | 11/1990 | Nakatsuru et al. | 701/115 |
| 4,994,934 | * | 2/1991 | Bouhenguel | 361/71 |
| 5,227,981 | * | 7/1993 | Katsuki et al. | 700/299 |
| 5,983,146 | * | 11/1999 | Sarbach | 701/36 |

FOREIGN PATENT DOCUMENTS 0 213 577 A2  8/1986  (EP).
0 393 631 A2  4/1990  (EP).

\* cited by examiner

*Primary Examiner*—Gary Chin
(74) *Attorney, Agent, or Firm*—Brinks, Hofer, Gilson & Lione (57) ABSTRACT

An on-vehicle electric unit has a microcomputer formed of a RAM which stores information indicating an operating condition of the on-vehicle electric unit and momentary-power-supply-interruption check information, a ROM which stores an operation program of the microcomputer, an initial value for the information indicating the operating condition, and the momentary-power-supply-interruption check information, and a CPU which controls the on-vehicle electric unit according to the information indicating the operating condition and the operation program, and a reset circuit which resets the microcomputer if a voltage of the on-vehicle power supply is reduced. The microcomputer checks whether the momentary-power-supply-interruption check information stored in the RAM remains when it is reset. When the momentary-power-supply-interruption check information is detected, the microcomputer determines that a momentary interruption of the on-vehicle power supply has occurred and restarts controlling the on-vehicle electric unit. If the momentary-power-supply-interruption check information is not detected, the microcomputer determines that not a momentary interruption of the on-vehicle power supply but a voltage drop lasting for a time period exceeding that of a momentary interruption has occurred, initializes the RAM, and then restarts controlling the on-vehicle electric unit.

3 Claims, 6 Drawing Sheets

| CREATING COPY DATA |
|---|
| CREATE TWO SETS OF COPIES IN THE FOLLOWING PROCEDURE WHEN VARIABLES A, B, AND C ARE TO BE STORED. |
| 1. ADD 1 TO VARIABLE BEGIN1.<br>2. COPY CONTENTS OF A INTO VARIABLE A_COPY1.<br>3. COPY CONTENTS OF B INTO VARIABLE B_COPY1.<br>4. COPY CONTENTS OF C INTO VARIABLE C_COPY1.<br>5. COPY INVERTED VALUE OF SUM OF CONTENTS OF A, B, AND C INTO SUM1.<br>6. COPY CONTENTS OF BEGIN1 INTO VARIABLE END1.<br>7. ADD 1 TO VARIABLE BEGIN2.<br>8. COPY CONTENTS OF A INTO VARIABLE A_COPY2.<br>9. COPY CONTENTS OF B INTO VARIABLE B_COPY2.<br>10. COPY CONTENTS OF C INTO VARABLE C_COPY2.<br>11. COPY INVERTED VALUE OF SUM OF CONTENTS OF A, B, AND C INTO SUM2.<br>12. COPY CONTENTS OF BEGIN2 INTO VARIABLE END2. |

| CHECKING IF MOMENTARY INTERRUPTION HAS OCCURRED |
|---|
| 1. WHEN BEGIN1 IS EQUAL TO END1, AND INVERTED VALUE OF SUM OF CONTENTS OF A_COPY1, B_COPY1, AND C_COPY1 IS EQUAL TO SUM1, IT IS DETERMINED THAT MOMENTARY INTERRUPTION HAS OCCURRED.<br><br>2. IF CONDITION 1 IS NOT SATISFIED; WHEN BEGIN2 IS EQUAL TO END2, AND INVERTED VALUE OF SUM OF CONTENTS OF A_COPY2, B_COPY2, AND C_COPY2 IS EQUAL TO SUM2, IT IS DETERMINED THAT MOMENTARY INTERRUPTION HAS OCCURRED.<br><br>3. IF CONDITION 2 IS NOT SATISFIED, IT IS NOT DETERMINED THAT MOMENTARY INTERRUPTION HAS OCCURRED. |

| RE-WRITING DATA AT MOMENTARY INTERRUPTION |
|---|
| 1. WHEN CONDITION 1 IN CHECKING IF MOMENTARY INTERRUPTION HAS OCCURRED IS SATISFIED, COPY A_COPY1, B_COPY1, AND C_COPY1 INTO A, B, AND C, RESPECTIVELY.<br><br>2. WHEN CONDITION 2 IN CHECKING IF MOMENTARY INTERRUPTION HAS OCCURRED IS SATISFIED, COPY A_COPY2, B_COPY2, AND C_COPY2 INTO A, B, AND C, RESPECTIVELY. |

MICROCOMPUTER-BUILT-IN, ON-VEHICLE ELECTRIC UNIT

BACKGROUND OF THE INVENTION

1. Field of the Invention

The present invention relates to microcomputer-built-in, on-vehicle electric units, and more specifically, to a microcomputer-built-in, on-vehicle electric unit in which stored information in a memory section can be maintained by easy and inexpensive means when the microcomputer is reset because the voltage of an on-vehicle power supply which drives the on-vehicle unit is reduced for some reason.

2. Description of the Related Art

For an on-vehicle electric unit, for example, for an on-vehicle air conditioner, a product inspection test generally includes an item in which, even if the voltage of an on-vehicle power supply (battery) which drives the on-vehicle air conditioner is reduced for several milliseconds to several seconds, information indicating the operating condition which specifies an operating state immediately before the voltage reduction shall be maintained. An on-vehicle air conditioner which satisfies specifications, including such an item, is produced.

An on-vehicle electric unit, for example, an on-vehicle air conditioner usually includes a manual-operation section formed of a pushbutton operating member for selecting an air outlet, a pushbutton operating member for making a selection from in-vehicle air circulation and ventilation, and a sliding operating member for selecting an inside-vehicle temperature. A CPU is also mounted to efficiently control the on-vehicle air conditioner, and a random access memory (RAM) and a read only memory (ROM) are also provided together with the CPU to serve as a microcomputer as a whole. Operation setting information specified when the manual-operation section is operated, and information indicating the operating condition of the on-vehicle air conditioner at automatically-set setting information are stored in the RAM. An operation program for operating the microcomputer is stored in the ROM. The automatically-set setting information refers to automatically-specified setting information such as a setting in which a front-face outlet is automatically selected as an air outlet when the on-vehicle air conditioner serves as a cooling system (cooling), and a setting in which a lower outlet is automatically selected as an air outlet when the on-vehicle air conditioner serves as a heater (heating).

When the voltage of an on-vehicle power supply which drives the on-vehicle air conditioner is reduced for several milliseconds to several seconds, a voltage applied to a reset IC which resets the microcomputer is reduced, and thereby the microcomputer is reset. The RAM contents, namely, the information indicating the operating condition which must be maintained in the RAM even if the voltage of the power supply drops, is deleted.

In a known on-vehicle air conditioner, some countermeasures have been taken against such a voltage drop of an on-vehicle power supply, in order to prevent the information indicating the operating condition stored in the RAM from being deleted.

Figure 5:
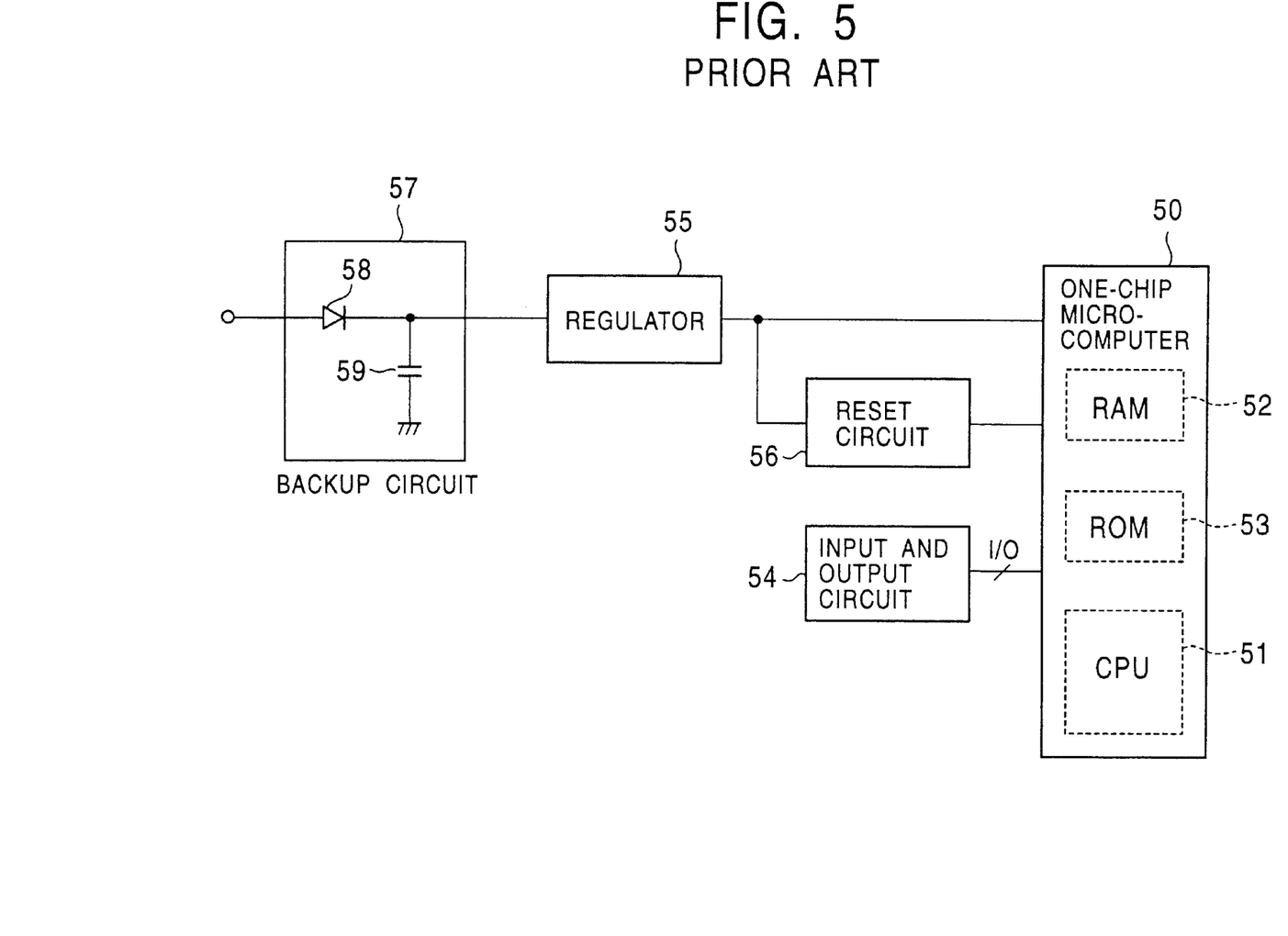
FIG. 5 is a block diagram of a known on-vehicle air conditioner provided with a countermeasure against a voltage drop of a power supply.

FIG. 5 is a block diagram of such a known on-vehicle air conditioner provided with a countermeasure against a voltage drop of an on-vehicle power supply.

As shown in FIG. 5, this on-vehicle air conditioner includes a one-chip microcomputer 50 formed of a central processing unit (CPU) 51, a RAM 52, and a ROM 53, an input and output circuit 54 which includes a manual-operation section, an air-feeding compressor, and a temperature control mechanism, a regulator 55 connected to a power supply for adjusting a power-supply voltage, a reset circuit 56 for detecting a voltage drop of the output voltage of the regulator 55 and generating a reset signal to the CPU 51, and a backup circuit 57 formed of a diode 58 connected in series and a large-capacitance capacitor 59 shunt-connected.

In this on-vehicle air conditioner, the large-capacitance capacitor 59 in the backup circuit 57 is always charged to have the voltage of an on-vehicle power supply (battery, not shown). If the voltage of the on-vehicle power supply is reduced for some reason, for example, due to an activation of a starter motor, a voltage drop is compensated for by discharging the charged voltage of the large-capacitance capacitor 59 to prevent the output voltage of the regulator 55 from being reduced.

Figure 6:
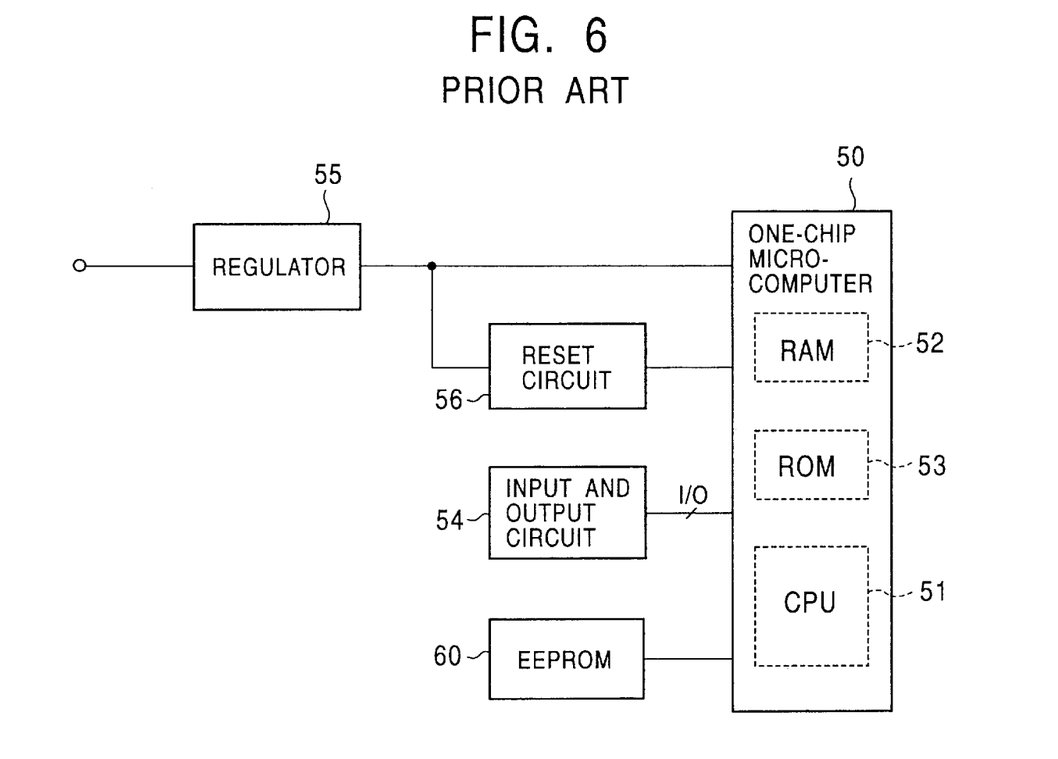
FIG. 6 is a block diagram of another known on-vehicle air conditioner provided with a countermeasure against a voltage drop of a power supply.

FIG. 6 is a block diagram of another known on-vehicle air conditioner provided with a countermeasure against a voltage drop of a power supply.

As shown in FIG. 6, this on-vehicle air conditioner differs from the on-vehicle air conditioner shown in FIG. 5 in that the backup circuit 57 is removed and an electrically erasable programmable read-only memory (EEPROM) 60 is provided instead.

In FIG. 6, the same symbols as those used in FIG. 5 are assigned to the same elements as those shown in FIG. 5, and descriptions thereof will be omitted.

In this on-vehicle air conditioner, information indicating an operating condition is stored in the EEPROM 60 as well as in a RAM 52 at the same time. If the voltage of an on-vehicle power supply is reduced for some reason, a CPU 51 reset due to a voltage drop reads the information indicating the operating condition stored in the EEPROM 60 and stores it into a RAM 52. Therefore, the information indicating the operating condition is always stored in the RAM 52 substantially.

In the known on-vehicle air conditioners each having a countermeasure against a voltage drop of the power supply, if the voltage of the on-vehicle power supply is reduced for several milliseconds to several seconds, by compensating the power-supply voltage by the use of the charged voltage of the large-capacitance capacitor 59 in the backup circuit 57, or by always storing the information indicating the operating condition stored in the EEPROM 60 into the RAM 52, the information indicating the operating condition stored in the RAM 52 is effectively maintained. Since special hardware, such as the backup circuit 57 and the EEPROM 60, has been added, the number of components increases, the structure becomes complicated, and the number of assembling processes also increases. In addition to these causes, since the large-capacitance capacitor 59 in the backup circuit 57 and the EEPROM 60 are expensive circuit components, the manufacturing cost of the on-vehicle air conditioner is increased and the price of the on-vehicle air conditioner is also increased.

SUMMARY OF THE INVENTION

Accordingly, an object of the present invention is to provide a microcomputer-built-in, on-vehicle electric unit which can maintain information indicating an operating condition stored in a RAM if a voltage of an on-vehicle power supply is reduced, without any special hardware with a least cost increase.

A RAM generally maintains its stored contents even if its power voltage drops for a short period of time. This short-time voltage drop in which the RAM maintains its stored contents is defined as a momentary interruption.

The foregoing object is achieved according to one aspect of the present invention through the provision of a microcomputer-built-in, on-vehicle electric unit including: a microcomputer formed of a RAM which stores information indicating an operating condition of the on-vehicle electric unit and momentary-power-supply-interruption check information, a ROM which stores an operation program of the microcomputer, an initial value for the information indicating the operating condition, and the momentary-power-supply-interruption check information, and a CPU which controls the on-vehicle electric unit according to the information indicating the operating condition and the operation program; and a reset circuit which resets the microcomputer if a voltage of an on-vehicle power supply which drives the on-vehicle electric unit is reduced, wherein the microcomputer checks whether the momentary-power-supply-interruption check information stored in the RAM remains when the microcomputer is reset by the reset circuit; when the momentary-power-supply-interruption check information is detected, the microcomputer determines that a momentary interruption of the on-vehicle power supply has occurred and restarts controlling the on-vehicle electric unit; and if the momentary-power-supply-interruption check information is not detected, the microcomputer determines that not a momentary interruption of the on-vehicle power supply but a voltage drop lasting for a time period exceeding that of a momentary interruption has occurred, initializes the RAM, including the momentary-power-supply-interruption check information, and then restarts controlling the on-vehicle electric unit.

As described above, according to one aspect of the present invention, since the momentary-power-supply-interruption check information is stored in the RAM, the microcomputer detects whether the momentary-power-supply-interruption check information stored in the RAM remains if the voltage of the on-vehicle power supply drops, and the microcomputer determines that a momentary power-supply interruption has occurred when the momentary-power-supply-interruption check information is detected, or the microcomputer determines that not a momentary power supply interruption but a voltage drop lasting for a time period exceeding that of a momentary interruption has occurred when the momentary-power-supply-interruption check information is not detected, special hardware, such as the backup circuit and the EEPROM, is not required, and thereby the number of components is reduced, the structure becomes simple, assembling becomes easy, and the production cost is reduced.

The foregoing object is achieved according to another aspect of the present invention through the provision of a microcomputer-built-in, on-vehicle electric unit including: a RAM which stores one or more sets of copied information obtained by copying at a constant time interval information indicating an operating condition of the on-vehicle electric unit; a ROM which stores an operation program of a microcomputer and an initial value for the information indicating the operating condition; a CPU which controls the on-vehicle electric unit according to the information indicating the operating condition and the operation program; and a reset circuit which resets the microcomputer, including the RAM, the ROM, and the CPU, if a voltage of an on-vehicle power supply for the on-vehicle electric unit is reduced, wherein the microcomputer checks the contents of the one or more sets of copied information stored in the RAM when the microcomputer is reset by the reset circuit; when the contents match the specified information contents, the microcomputer determines that: a momentary interruption of the on-vehicle power supply has occurred and restarts controlling the on-vehicle electric unit; and if the contents do not match the specified information contents, the microcomputer determines that not a momentary interruption of the on-vehicle power supply but a voltage drop lasting for a time period exceeding that of a momentary interruption has occurred, initializes the RAM, and then stores one or more sets of information indicating the operating condition by copying as well as restarts controlling the on-vehicle electric unit.

According to the above aspect of the present invention, since one or more sets of copied information obtained by copying at a constant time interval the information indicating the operating condition are stored into the RAM; the microcomputer checks whether one or more sets of copied information stored in the RAM have the specified information contents when the voltage of the on-vehicle power supply drops; if the specified information contents are satisfied, it is determined that a momentary interruption of the on-vehicle power supply has occurred; and if the specified information contents are not satisfied, it is determined that not a momentary interruption of the on-vehicle power supply but a voltage drop lasting for a time period exceeding that of a momentary interruption has occurred, special hardware, such as the backup circuit and the EEPROM, is not required, and thereby the number of components is reduced, the structure becomes simple, assembling becomes easy, and the production cost is reduced.

The microcomputer-built-in, on-vehicle electric unit may be configured such that the on-vehicle electric unit serves as an on-vehicle air conditioner, and the information indicating the operating condition includes information indicating a selected air outlet in the on-vehicle air conditioner, a selection from in-vehicle air circulation and ventilation, and an operating condition of a compressor which determines the amount of output air.

BRIEF DESCRIPTION OF THE DRAWINGS

FIG. 4 shows procedures for creating two sets of copied information, for checking whether a momentary interruption has occurred, and for creating copied information at a momentary interruption in the second embodiment.

DESCRIPTION OF THE PREFERRED EMBODIMENT

Embodiments of the present invention will be described below by referring to the drawings.

Figure 1:
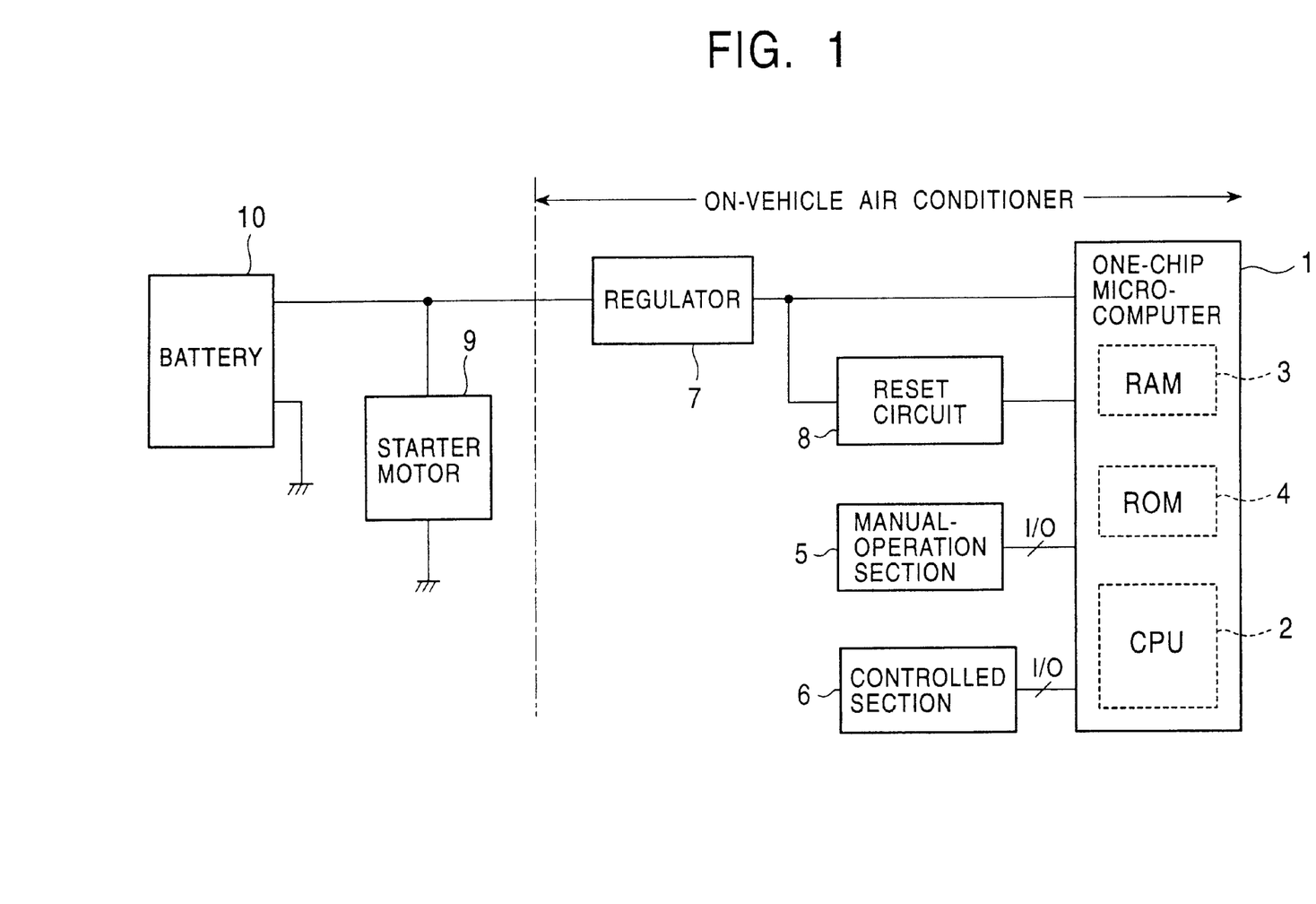
FIG. 1 is a block diagram of a microcomputer-built-in, on-vehicle electric unit according to a first embodiment of the present invention.

FIG. 1 is a block diagram showing a configuration of an on-vehicle electric unit in which a microcomputer is built according to a first embodiment of the present invention. The on-vehicle electric unit serves as an on-vehicle air conditioner in this embodiment.

As shown in FIG. 1, the on-vehicle air conditioner according to the present invention is provided with a one-chip microcomputer 1 formed of a central processing unit (CPU) 2, a random access memory (RAM) 3, and a read only memory (ROM) 4, a manual-operation section 5, a controlled section 6, a regulator 7, and a reset circuit 8. A starter motor 9 and an on-vehicle power supply (battery) 10 are connected to the on-vehicle air conditioner.

The manual-operation section 5 is disposed in a front panel of the on-vehicle air conditioner and includes a pushbutton operating member for selecting an air outlet, a pushbutton operating member for making a selection from in-vehicle air circulation and ventilation, and a sliding operating member for specifying the temperature of a supply air and the amount of air. The manual-operation section 5 is connected to the microcomputer 1 through an I/O line. The controlled section 6 forms an input and output section which includes an air compressor and a temperature control mechanism for a circulating air, and is connected to the microcomputer 1 through an I/O line. The regulator 7 is inserted into a power supply circuit of the microcomputer 1 and adjusts the output voltage of the on-vehicle power supply (battery) 10. The reset circuit 8 generates a reset signal when it detects a reduction in the output voltage of the regulator 7, and sends the signal to the CPU 2. The starter motor 9 is connected between the output terminals of the on-vehicle power supply 10. When the starter motor 9 is driven, a high current flows through it.

The on-vehicle air conditioner according to the first embodiment of the present invention will be described below. In the first embodiment, the RAM 3 stores momentary-power-supply-interruption information, information indicating the operating condition of the on-vehicle air conditioner, including operation setting information and automatically-set setting information, and other pieces of information, and the ROM 4 stores an operation program for operating the CPU 2.

The automatically-set setting information refers to automatically-specified setting information such as a setting in which a front-face outlet is automatically selected as an air outlet when the on-vehicle air conditioner serves as a cooling system (cooling), and a setting in which a lower outlet is automatically selected as an air outlet when the on-vehicle air conditioner serves as a heater (heating).

Among these pieces of information, the momentary-power-supply-interruption check information is used for determining whether the power supply of the microcomputer 1 has been momentarily interrupted. When the on-vehicle air conditioner is turned on, the CPU 2 writes the momentary-power-supply-interruption check information into a part of a memory area in the RAM 3, preferably at both top and bottom of the memory area, and the information is stored there. The contents of the momentary-power-supply-interruption check information are not specified, but they need to be not affected by noise. For example, an information pattern in which a plurality of binary codes, 0's and 1's, are disposed alternately in the horizontal direction and the vertical direction in a memory area, namely, a check pattern is used. The information indicating the operating condition needs to be maintained in the RAM 3 according to the specifications when the power supply is momentarily interrupted. The information includes the automatically-set setting information, and operation setting conditions in the manual-operation section, namely, operation setting information indicating an operation setting condition for an air outlet, an operation setting condition for in-vehicle air circulation or ventilation, and an operation setting condition for the temperature of a supply air and the amount of air. When the on-vehicle air condition is turned on, the CPU 2 writes the information indicating the operating condition into a memory area for the information in the memory area in the RAM 3, and the information is stored there. The other pieces of information includes various pieces of information (data) sequentially obtained when the CPU 2 controls the on-vehicle air conditioner and additional information (data). The CPU 2 writes these pieces of information into a memory area for the information in the memory area in the RAM 3 and the information is stored there.

Figure 2:
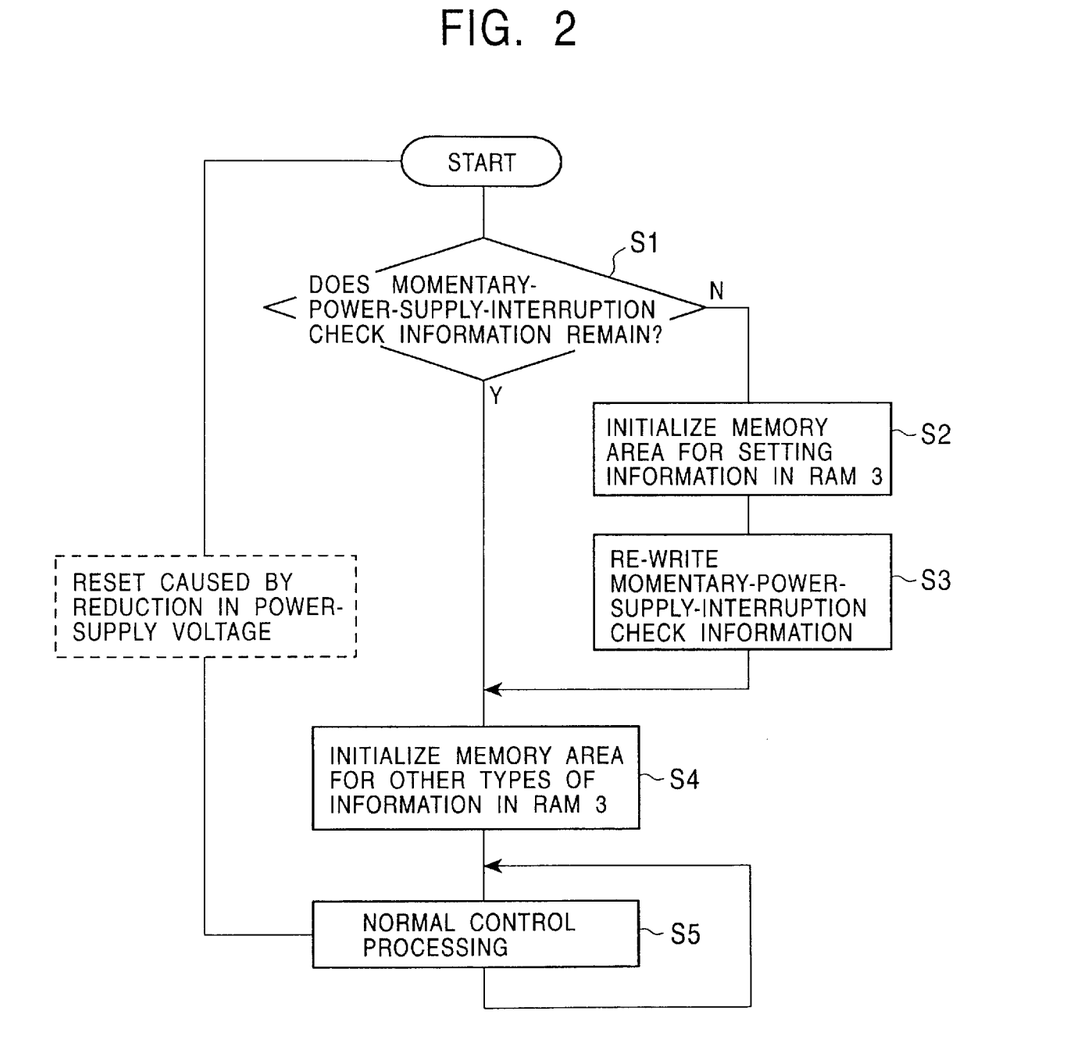
FIG. 2 is a flowchart showing an outlined operation state of the microcomputer-built-in, on-vehicle electric unit shown in FIG. 1 according to the first embodiment.

FIG. 2 is a flowchart indicating a general operation state of the on-vehicle air conditioner according to the first embodiment.

An operation in the first embodiment will be described below by referring to the flowchart shown in FIG. 2.

While the CPU 2 controls the controlled section 6 (normal control processing) based on the operation setting information and the other pieces of information stored in the RAM 3 according to the operation program stored in the ROM 4, when the starter motor 9 of the on-vehicle air conditioner is driven and an instantaneous high current flows through the starter motor 9 or an instantaneous high current flows through a circuit section other than the starter motor 9, the output voltage of the on-vehicle power supply 10 is instantaneously reduced much due to its internal resistor, for example, for about one second, and the reduced voltage is supplied to the regulator 7. In another case, when the output voltage of the on-vehicle power supply 10 is instantaneously reduced for some reason, the reduced voltage is supplied to the regulator 7. The regulator 7 compensates the supplied voltage for its reduction to some extent. If the voltage drop is relatively large, sufficient compensation cannot be performed. The regulator 7 outputs a reduced voltage and supplies it to the microcomputer 1 (CPU 2, RAM 3, and ROM 4) and to the reset circuit 8.

The reset circuit 8 detects a reduction in the power supply voltage, generates a reset signal, and sends it to the CPU 2 of the microcomputer 1. The CPU 2 is reset by the sent reset signal and starts operating according to the flowchart shown in FIG. 2.

In a step S1, the CPU 2 checks whether the momentary-power-supply-interruption check information stored in advance in the RAM 3 remains as is irrespective of a reduction in the power-supply voltage. When the CPU 2 finds according to the check that the momentary-power-supply-interruption check information has not remained as is (N), the CPU 2 determines that not a momentary power-supply interruption but a voltage drop lasting for a time period exceeding that of a momentary interruption has occurred. In other words, it is determined that all information stored in the RAM 3 is deleted or changed, and the procedure proceeds to the next step S2. On the other hand, when the CPU 2 finds that the momentary-power-supply-interruption check information has remained as is (Y), the CPU 2 determines that a momentary power-supply interruption has occurred. In other words, it is determined that all information stored in the RAM 3 remains, and the procedure proceeds to a step S4.

In the step S2, according to the decision that the voltage drop has occurred for the time period exceeding that of a momentary interruption and that the information indicating the operating condition has been deleted or changed, the CPU 2 initializes the memory area in the RAM 3 for the information indicating the operating condition to delete all the information indicating the operating conditions, which has been deleted or changed, and writes the initial settings.

In the next step S3, according to the decision that the voltage drop has occurred for the time period exceeding that of a momentary interruption and that the information indicating the operating condition has been deleted or changed, the CPU 2 overwrites the momentary-power-supply-interruption check information into the memory area in the RAM 3 for the momentary-power-supply-interruption check information to store it. The momentary-power-supply-interruption check information stored in the ROM 4 is used.

In the step S4, since the CPU 2 cannot use the other pieces of information stored in the RAM 3 due to its reset, the CPU 2 initializes the memory area in the RAM 3 for the other pieces of information to delete all the other pieces of information, and writes the initial settings.

In a step S5, the CPU 2 stores the momentary-power-supply-interruption check information, the information indicating the operating condition, and the other pieces of information into the RAM 3. Since the contents stored in the RAM 3 return to the condition obtained before the voltage reduction of the on-vehicle power supply occurred, the CPU 2 restarts a control operation of the controlled section 6 (normal control processing). In this point of time, specifically, the settings of various switches in the on-vehicle air conditioner are read, the values of various sensors are read, and the information of motor control, relay control, and a display device (LED) and setting information are read.

As described above, according to the first embodiment, since the momentary-power-supply-interruption check information is stored in the RAM 3; the microcomputer detects whether the momentary-power-supply-interruption check information stored in the RAM 3 remains if the voltage of the on-vehicle power supply drops; and the CPU 2 determines that a momentary power supply interruption has occurred when the momentary-power-supply-interruption check information is detected, or the CPU determines that not a momentary power supply interruption but a voltage drop lasting for a time period exceeding that of a momentary interruption has occurred when it is found that the momentary-power-supply-interruption check information has been deleted or changed, unlike the known on-vehicle air conditioner, neither the backup circuit nor the EEPROM is required, and thereby the production cost is reduced.

An on-vehicle air conditioner according to a second embodiment of the present invention will be described below. A circuit configuration in the second embodiment is the same as that shown in FIG. 1. In the second embodiment, however, a RAM 3 stores one or more sets of copied information and other pieces of information, and the ROM 4 stores an operation program for operating a CPU 2.

In the above information, since the other pieces of information and the operation program are substantially the same as those used in the first embodiment, descriptions thereof will be omitted. One or more sets of copied information is obtained by copying the information indicating the operating condition at a constant time interval while the CPU 2 performs control of the controlled section 6 (normal control processing). The CPU 2 updates the copied information copied from the information indicating the operating condition at a constant time interval, and always stores one or more sets of the obtained latest copied information into the RAM 3. In the second embodiment, one or more sets of the copied information are substituted for the momentary-power-supply-interruption check information used in the first embodiment.

Figure 3:
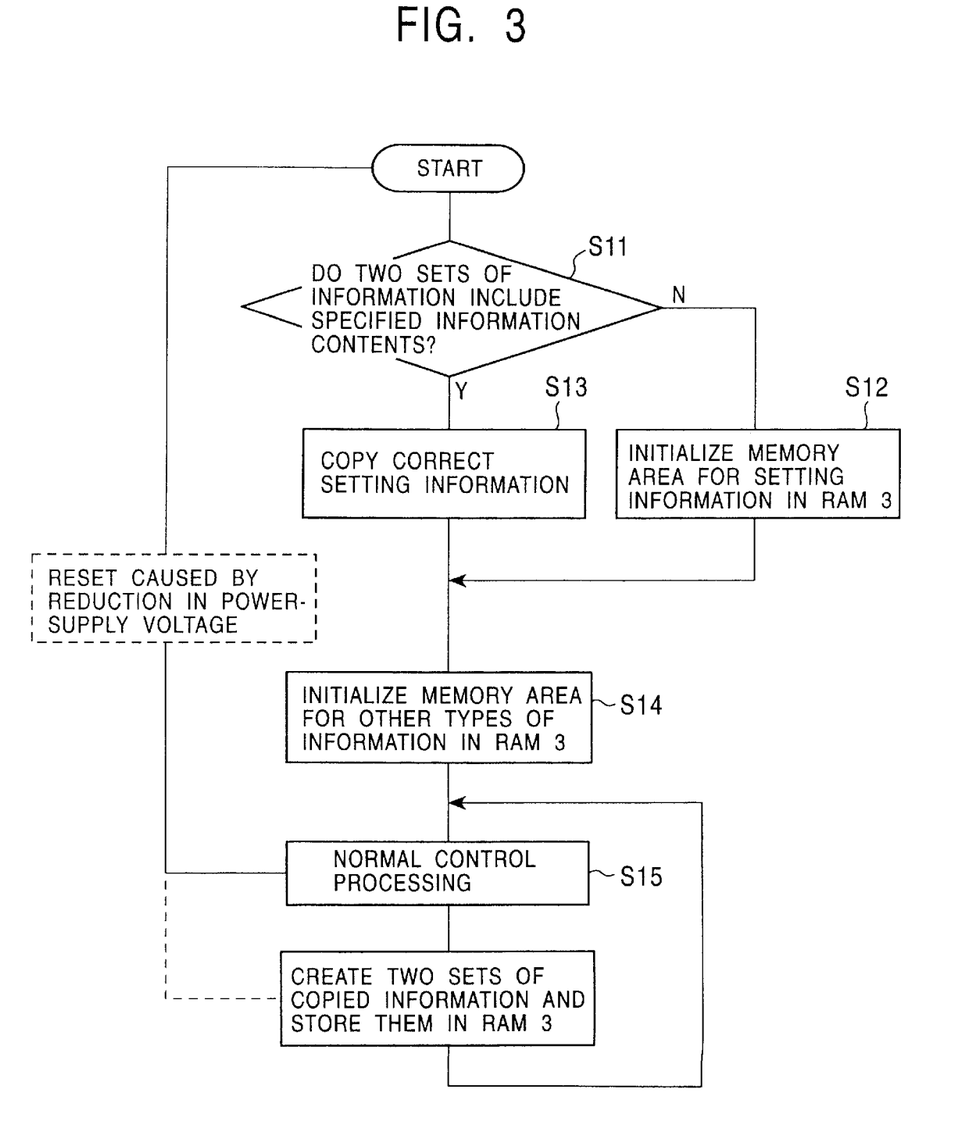
FIG. 3 is a flowchart showing an outlined operation state of the microcomputer-built-in, on-vehicle electric unit shown in FIG. 1 according to a second embodiment.

FIG. 3 is a flowchart indicating a general operation state of the on-vehicle air conditioner according to the second embodiment. FIG. 4 shows procedures for creating two sets of copied information, for checking if momentary interruption has occurred, and for creating copied information at momentary interruption in the second embodiment.

An operation in the second embodiment will be described below by referring to the flowchart shown in FIG. 3 and the procedures shown in FIG. 4.

In the second embodiment, while the CPU 2 controls the controlled section 6 (normal control processing) based on the information indicating the operating condition and other pieces of information stored in the RAM 3 according to the operation program stored in the ROM 4, the CPU 2 creates two sets of copied information at a constant time interval.

A procedure for creating the two sets of copied information will be described below by referring to the copy procedure shown in FIG. 4. In the following description, to make it simple, the information indicating the operating condition, namely, the information indicating the operating condition which needs to be maintained in the RAM 3 at momentary interruption of the power supply, is called A, B, and C, two rolling codes assigned to two sets of copied information obtained in the previous time are set to $R_{1O}$ and $R_{2O}$, and two rolling codes assigned to two sets of copied information obtained at this time are set to $R_{11}$ and $R_{21}$, which are incremented by 1 from the codes $R_{1O}$ and $R_{2O}$.

When the CPU 2 copies the information indicating the operating condition, and according to the information, the CPU 2 stores two sets of copied information into the RAM 3, a first set of copied information includes one rolling code, $R_{11}$, at this time, stored in a memory area "$r_1$" in the RAM 3, the information indicating the operating condition, A, B, and C stored in memory areas, "$a_1$," "$b_1$," and "$c_1$," confirmation information obtained by inverting the sum of the information indicating the operating condition, A, B, and C, stored in a memory area "$s_1$," and one rolling code $R_{11}$ stored in a memory area "$e_1$," in the same way as in the memory area "$r_1$." A second set of copied information includes the other rolling code, $R_{21}$, at this time, stored in a memory area "$r_2$" in the RAM 3, the information indicating the operating condition, A, B, and C stored in memory areas, "$a_2$," "$b_2$," and "$c_2$," confirmation obtained by inverting the sum of the information indicating the operating condition, A, B, and C, stored in a memory area "$s_2$," and the other rolling code $R_{21}$ stored in a memory area "$e_2$."

During the operation of the on-vehicle air conditioner, when the starter motor 9 is driven and an instantaneous high current flows through the starter motor 9 or an instantaneous high current flows through a circuit section other than the starter motor 9, the output voltage of the on-vehicle power supply 10 is instantaneously reduced much due to its internal resistor, for example, for about one second, and the reduced voltage is supplied to the regulator 7. In another case, when the output voltage of the on-vehicle power supply 10 is instantaneously reduced for some reason, the reduced voltage is supplied to the regulator 7. The regulator 7 compensates the supplied voltage for its reduction to some extent. If the voltage drop is relatively large, sufficient compensation cannot be performed. The regulator 7 outputs a reduced voltage and supplies it to the microcomputer 1 (CPU 2, RAM 3, and ROM 4) and to the reset circuit 8.

The reset circuit 8 detects a reduction in the power supply voltage, generates a reset signal, and sends it to the CPU 2 of the microcomputer 1. The CPU 2 is reset by the sent reset signal and starts operating according to the flowchart shown in FIG. 3.

In a step S11, the CPU 2 checks whether the two sets of copied information stored in the RAM 3 have the specified information contents described later, irrespective of a reduction in the power-supply voltage. When the CPU 2 finds according to the check that the two sets of copied information does not have the specified information contents (N), the CPU 2 determines that not a momentary power-supply interruption but a voltage drop lasting for a time period exceeding that of a momentary interruption has occurred. In other words, it is determined that all information stored in the RAM 3 has been deleted or changed, and the procedure proceeds to the next step S12. On the other hand, when the CPU 2 finds that the two sets of copied information have the specified information contents (Y), the CPU 2 determines that a momentary power-supply interruption has occurred. In other words, it is determined that all information stored in the RAM 3 remains, and the procedure proceeds to a step S13.

Whether the two sets of copied information have the specified information contents is checked separately for each of the two sets of copied information. For example, it is performed in the following way.

As indicated in the procedure for checking the information contents shown in FIG. 4, the CPU 2 detects for the first set of copied information that the memory contents stored at the memory area "$r_1$" and at the memory area "$e_1$" in the RAM 3 match and that the memory contents stored in the memory area "$s_1$" match the confirmation information obtained by inverting the sum of the information indicating the operating condition, $a_1$, $b_1$, and $c_1$. When these match conditions are satisfied, the CPU 2 determines that the specified information contents are satisfied. If these match conditions are not satisfied, the CPU 2 detects for the second set of copied information that the memory contents stored at the memory area "$r_2$" and at the memory area "$e_2$" in the RAM 3 match and that the memory contents stored in the memory area "$s_2$" match the confirmation information obtained by inverting the sum of the information indicating the operating condition, $a_1$, $b_1$, and $c_1$. When these match conditions are satisfied, the CPU 2 determines that the specified information contents are satisfied. If the above match conditions are not satisfied for each of the first and second sets of copied information, it is determined that the specified information contents are not satisfied.

In the step S12, according to the decision that the voltage drop has occurred for the time period exceeding that of a momentary interruption, the CPU 2 determines that all information stored in the RAM 3 has been deleted or changed. The CPU 2 initializes the memory area in the RAM 3 for the information indicating the operating condition to delete all the information indicating the operating condition, which has been deleted or changed, and writes the initial settings.

In a step S13, even if it is determined that a momentary interruption of the power supply has occurred, since either the first set or the second set of copied information stored in the RAM 3 may have been deleted or changed, the CPU 2 recovers either the first set or the second set of copied information in the following way.

As indicated in the procedure for recovering the information indicating the operating condition shown in FIG. 4, when the above-described match conditions are satisfied for the first set of copied information, the pieces of information stored in the memory areas "$a_1$," "$b_1$," and "$c_1$" in the RAM 3 are copied onto the memory areas A, B, and C in the RAM 3, respectively, and the pieces of information stored in the memory areas "$r_1$," "$a_1$," "$b_1$," "$c_1$," "$s_1$," and "$e_1$" in the RAM 3 are copied onto the memory areas "$r_2$," "$a_2$," "$b_2$," "$c_2$," "$s_2$," and "$e_2$" in the RAM 3, respectively. When the above-described match conditions are satisfied for the second set of copied information, the pieces of information stored in the memory areas "$a_2$," "$b_2$," and "$c_2$" in the RAM 3 are copied onto the memory areas A, B, and C in the RAM 3, respectively, and the pieces of information stored in the memory areas "$r_2$," "$a_2$," "$b_2$," "$c_2$," "$s_2$," and "$e_2$" in the RAM 3 are copied onto the memory areas "$r_1$," "$a_1$," "$b_1$," "$c_1$," "$s_1$," and "$e_1$" in the RAM 3, respectively.

In the next step S14, since the CPU 2 cannot use other pieces of information stored in the RAM 3 due to its reset, the CPU 2 initializes the memory area in the RAM 3 for the other pieces of information to delete all the other pieces of information, and writes the initial settings.

In a step S15, since the contents stored in the RAM 3 return to the condition obtained before the voltage drop of the power supply occurred, the CPU 2 restarts a control operation of the controlled section 6 (normal control processing).

As described above, according to the second embodiment, since the two sets of copied information obtained by copying at a constant time interval the information indicating the operating condition are stored into the RAM 3; the CPU 2 checks whether the two sets of copied information stored in the RAM 3 have the specified information contents when the voltage of the on-vehicle power supply drops; if the specified information contents are satisfied, it is determined that a momentary interruption of the on-vehicle power supply has occurred; and if the specified information contents are not satisfied, it is determined that not a momentary interruption of the on-vehicle power supply but a voltage drop lasting for a time period exceeding that of a momentary interruption has occurred, unlike the known on-vehicle air conditioner, neither the backup circuit nor the EEPROM is required, and thereby the number of components is reduced, the structure becomes simple, assembling becomes easy, and the production cost is reduced.

In each of the above embodiments, the on-vehicle electric unit serves as an on-vehicle air conditioner. An on-vehicle electric unit according to the present invention is not limited to an on-vehicle air conditioner. It is a matter of course that an on-vehicle electric unit similar to the on-vehicle air conditioner may be used.

In each of the above embodiments, the information indicating the operating condition to be maintained in the RAM 3 if the power supply is momentarily interrupted includes information indicating an operation setting condition for an air outlet in the on-vehicle air conditioner, an operation setting condition for in-vehicle air circulation or ventilation, and an operation setting conditions for the temperature of a supply air and the amount of air. The information indicating the operating condition of an on-vehicle air conditioner according to the present invention is not limited to those pieces of information. It is a matter of course that the information may include other pieces of information.

In the second embodiment, the two sets of copied information are stored in the RAM 3. The number of copied information sets is not limited to two, but may be just one.

The scope of the present invention is not limited to that described in the above embodiments. It can be modified as required unless it exceeds the technical contents of the present invention.

What is claimed is:

1. An on-vehicle electric unit comprising:

a built-in microcomputer including:

a Random Access Memory (RAM) that stores a plurality of sets of information obtained at a constant time interval, each said plurality of sets of information including information about an operating condition of said on-vehicle electric unit;

a Read Only Memory (ROM) that stores an operation program for the built-in microcomputer and an initial value for the operating condition of said on-vehicle electric unit;

a Central Processing Unit (CPU) that controls said on-vehicle electric unit according to the information about the operating condition and the operation program; and a reset circuit that resets the built-in microcomputer, when a voltage of an on-vehicle power supply for said on-vehicle electric unit is reduced, wherein the CPU compares corresponding information within the plurality of sets of information stored in said RAM when the microcomputer is reset by said reset circuit and, if the corresponding information match each other, the CPU determines that a momentary interruption of the on-vehicle power supply has occurred, and restarts controlling said on-vehicle electric unit;

and if the corresponding information do not match each other, the CPU determines that a voltage drop lasting for a time period exceeding that of a momentary interruption has occurred, the CPU initializes said RAM, and restarts controlling said on-vehicle electric unit.

2. The on-vehicle electric unit according to claim 1, wherein said on-vehicle electric unit serves as an on-vehicle air conditioner, and the information about the operating condition includes information indicating a selected air outlet in the on-vehicle air conditioner, a selection from in-vehicle air circulation and ventilation, and an operating condition of a compressor which determines the amount of output air.

3. An on-vehicle electric unit comprising:

a built-in microcomputer including:

a Random Access Memory (RAM) that stores a plurality of sets of information obtained at a constant time interval, each said plurality of sets of information including information about an operating condition of said on-vehicle electric unit;

a Read Only Memory (ROM) that stores an operation program for the built-in microcomputer and an initial value for the operating condition of said on-vehicle electric unit;

a Central Processing Unit (CPU) that controls said on-vehicle electric unit according to the information about the operating condition and the operation program; and a reset circuit that resets the built-in microcomputer, when a voltage of an on-vehicle power supply for said on-vehicle electric unit is reduced, wherein the CPU compares corresponding information within the plurality of sets of information stored in said RAM when the microcomputer is reset by said reset circuit and, if the corresponding information match each other, the CPU determines that a momentary interruption of the on-vehicle power supply has occurred, and restarts controlling said on-vehicle electric unit;

and if the corresponding information do not match each other, the CPU determines that a voltage drop lasting for a time period exceeding that of a momentary interruption has occurred, the CPU initializes said RAM, and restarts controlling said on-vehicle electric unit, wherein the corresponding information includes:

the information about the operating condition, confirmation information obtained by inverting a sum of the information about the operating condition, and two rolling codes; and wherein the CPU determines that a momentary interruption of the on-vehicle power supply has occurred if the inverted sum of the current information about the operating condition matches the confirmation information, and if the two rolling codes match each other.

* * * * *